(Model.)

J. D. HEEBNER.
HARVESTER BINDER.

No. 278,956.  Patented June 5, 1883.

6 Sheets—Sheet 2.

Attest,
W. H. H. Knight
J. E. Knight

Inventor,
Josiah D. Heebner,
By Hill & Church
His Atty.

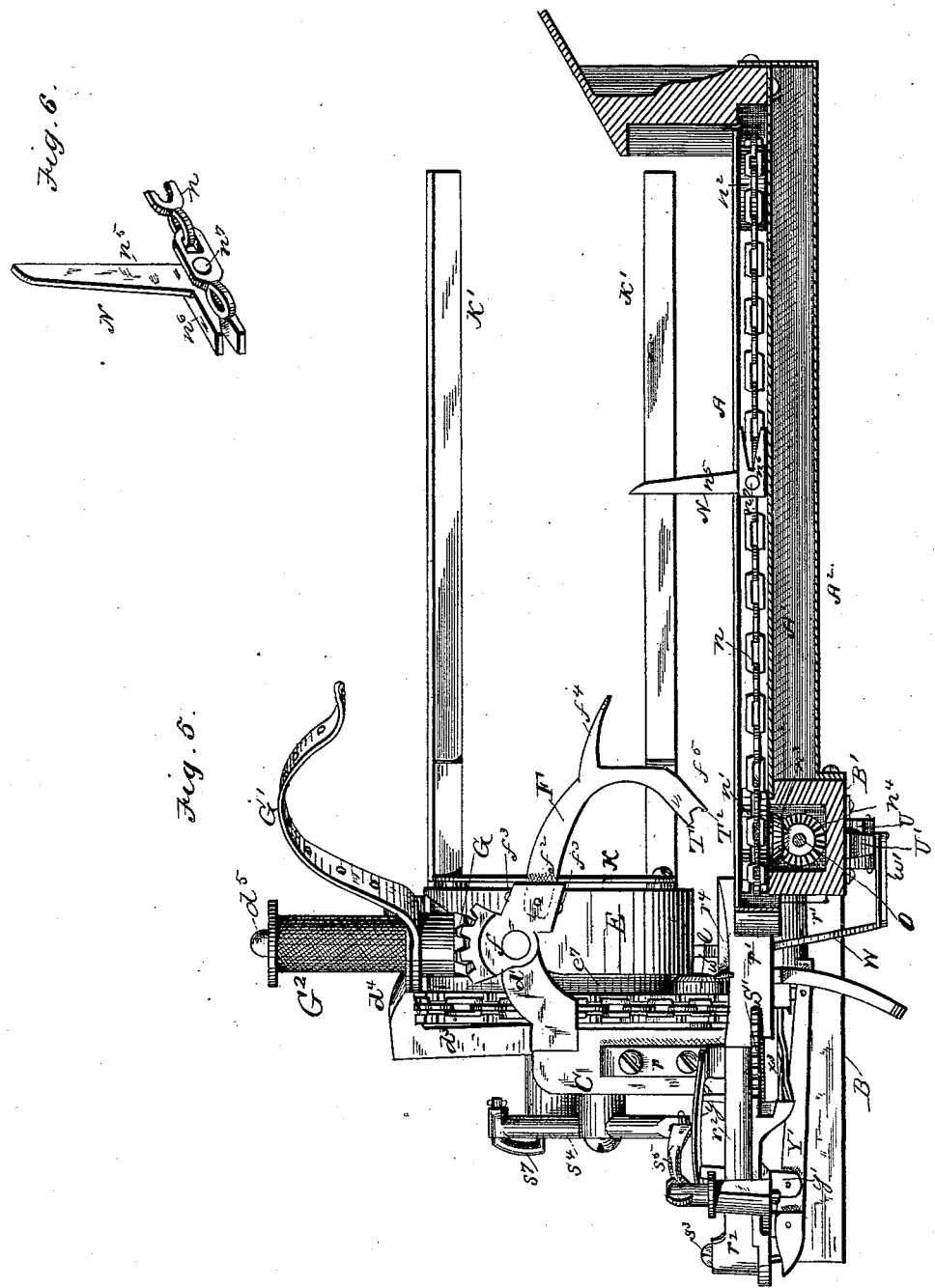

(Model.)  6 Sheets—Sheet 4.

J. D. HEEBNER.
HARVESTER BINDER.

No. 278,956. Patented June 5, 1883.

Attest.
W. H. H. Knight.
J. E. Knight.

Inventor.
Josiah D. Heebner
By Hill & Church
His Attys

N. PETERS. Photo-Lithographer, Washington, D. C.

(Model.)

6 Sheets—Sheet 5.

J. D. HEEBNER.
HARVESTER BINDER.

No. 278,956. Patented June 5, 1883.

Attest,
W. H. H. Knight
J. E. Knight

Inventor,
Josiah D. Heebner
By Hin & Church
His Attys (Model.)
6 Sheets—Sheet 6.
J. D. HEEBNER.
HARVESTER BINDER.
No. 278,956. Patented June 5, 1883.
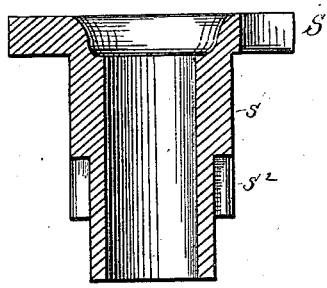
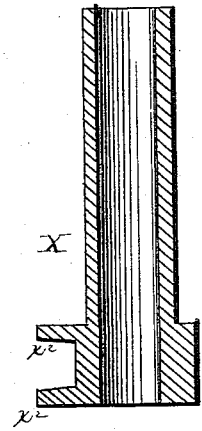
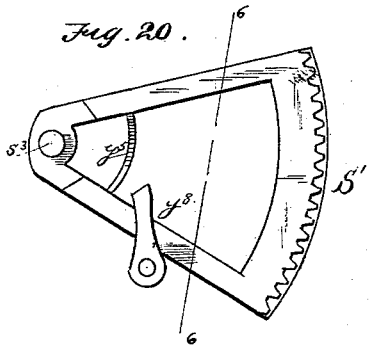
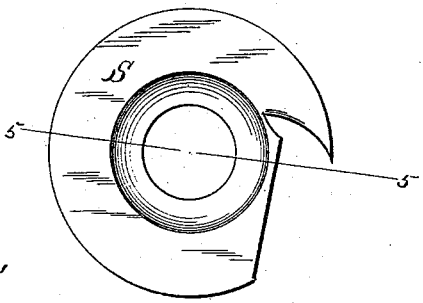
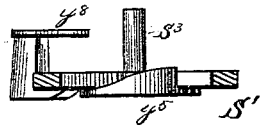
Attest.
W. H. H. Knight
J. E. Knight
Inventor.
Josiah D. Heebner
By Hill & Church
His Attys

UNITED STATES PATENT OFFICE.

JOSIAH D. HEEBNER, OF LANSDALE, PENNSYLVANIA, ASSIGNOR OF ONE-HALF TO DAVID S. HEEBNER, ISAAC D. HEEBNER, AND WILLIAM D. HEEBNER.

HARVESTER-BINDER.

SPECIFICATION forming part of Letters Patent No. 278,956, dated June 5, 1883.

Application filed May 21, 1880. (Model.)

*To all whom it may concern:*

Be it known that I, JOSIAH D. HEEBNER, of Lansdale, in the county of Montgomery and State of Pennsylvania, have invented certain new and useful Improvements in Harvester-Binders; and I do hereby declare the following to be a full, clear, and exact description of the same, reference being had to the accompanying drawings, forming part of this specification, in which—

Figure 1:
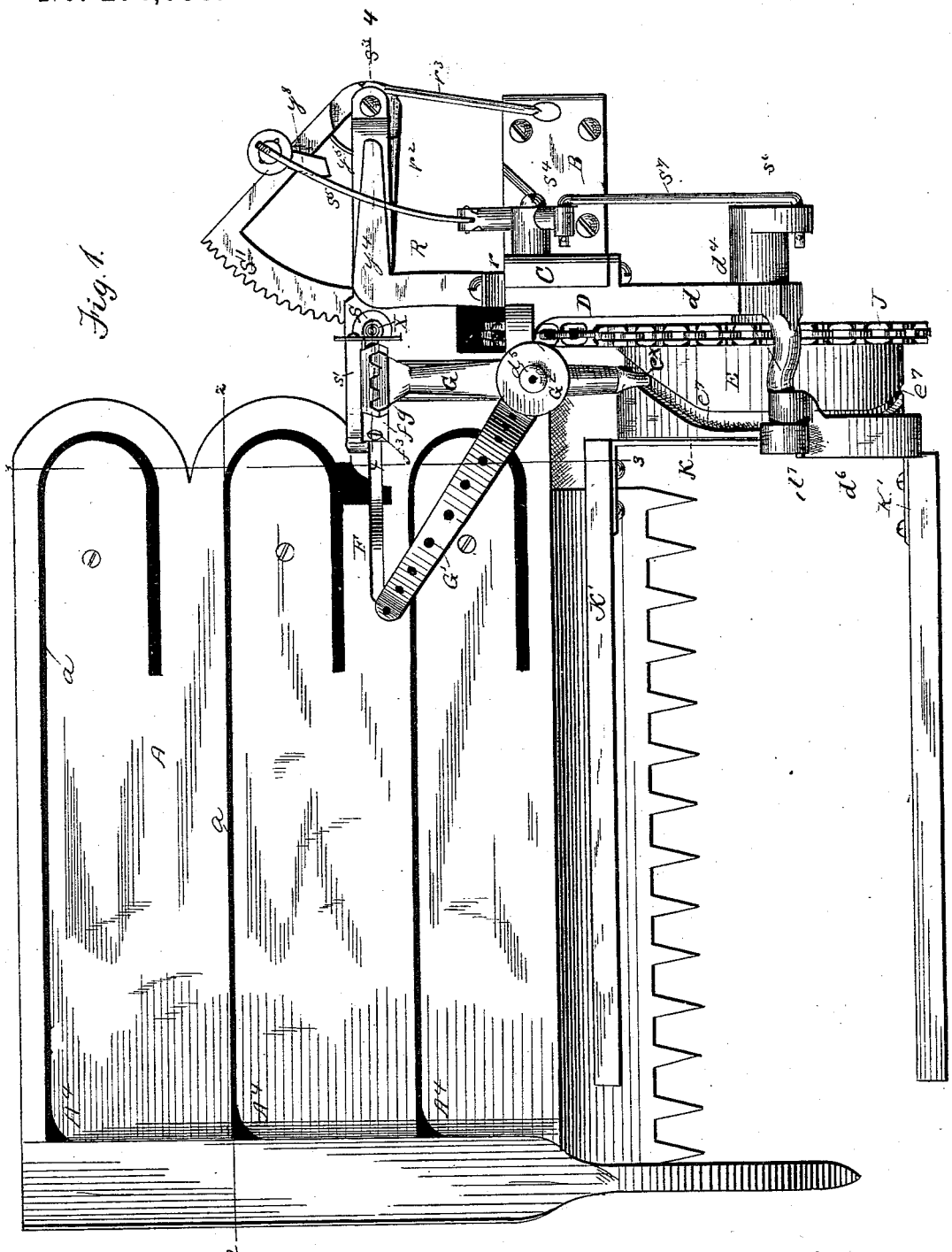
Figure 2:
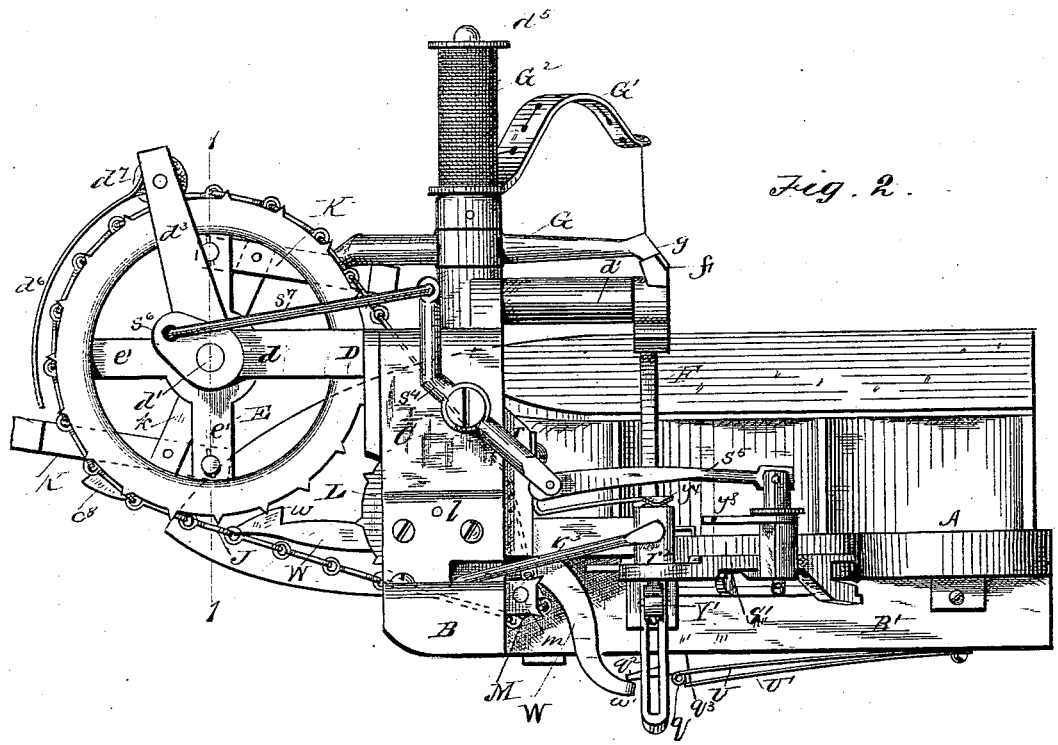
Figure 3:
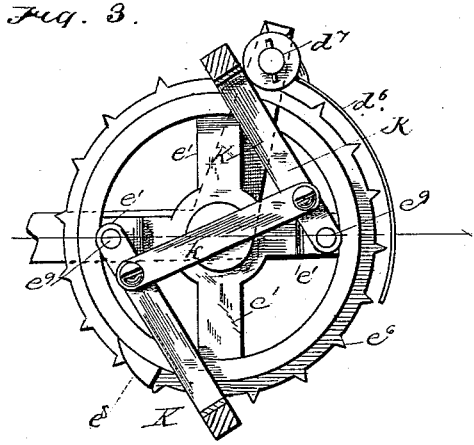
Figure 4:
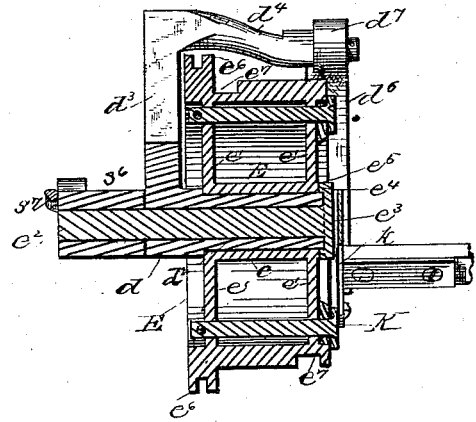
Figure 7:
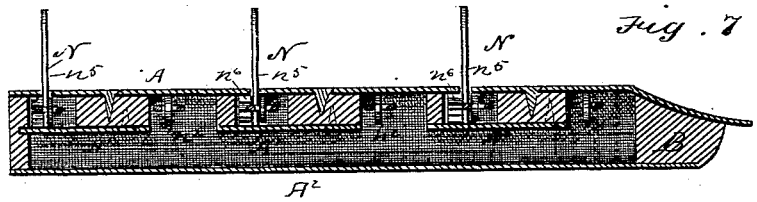
Figure 9:
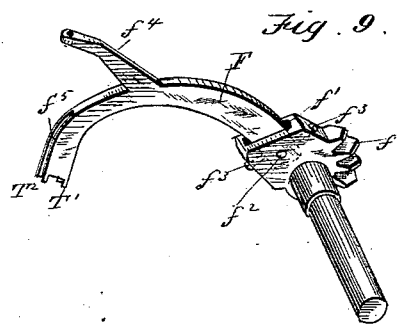
Figure 8:
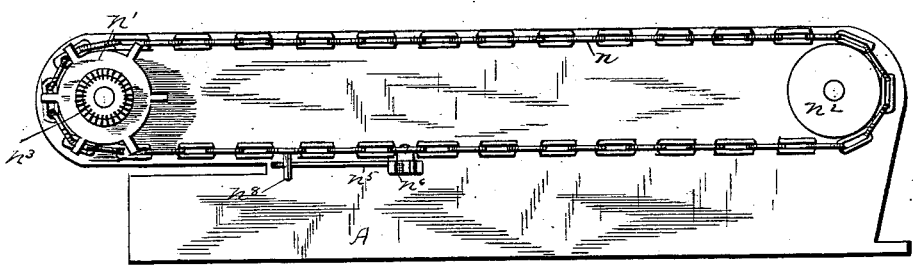
Figure 10:
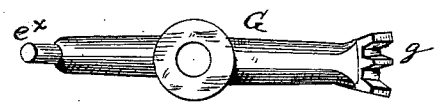
Figure 11:
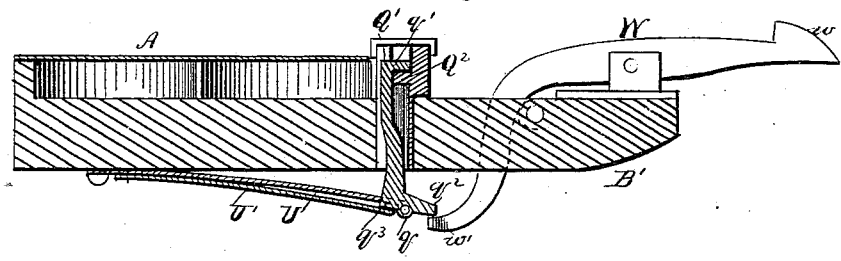
Figure 12:
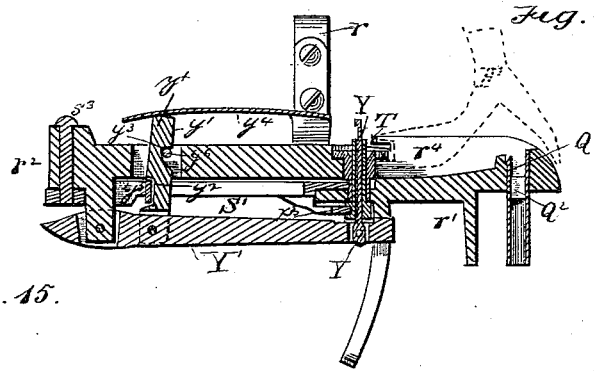
Figure 15:
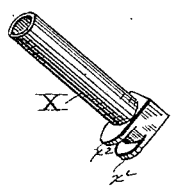
Figure 14:
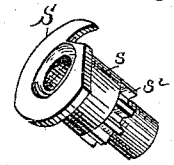
Figure 13:
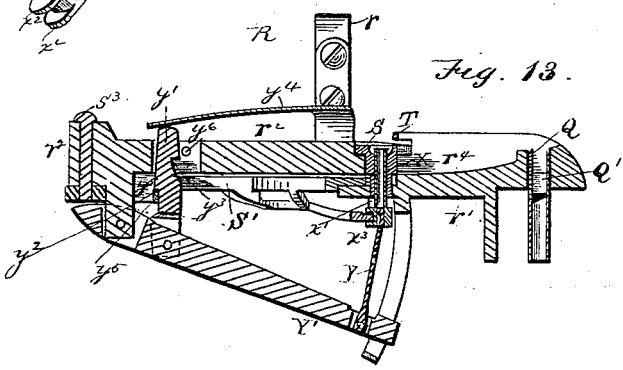
Figure 16:
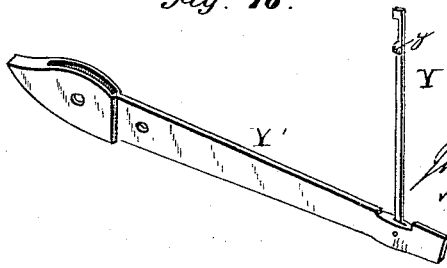

Figure 1 is a plan view; Fig. 2, a side elevation; Fig. 3, a detached view of the grain-reel; Fig. 4, a sectional view taken on the line 1 1, Fig. 2; Fig. 5, a view taken on the line 2 2, Fig. 1; Fig. 6, a detached view of one of the rake-teeth; Fig. 7, a cross-sectional view of the platform; Fig. 8, a bottom plan view of one of the endless rake-belts; Fig. 9, a perspective view of the cord-carrying arm; Fig. 10, a detached view of the lever for operating the cord-carrying arm; Fig. 11, a sectional view taken on the line 3 3, Fig. 1; Figs. 12 and 13, sectional views taken on the line 4 4, Fig. 1, showing the parts in different positions; Fig. 14, a perspective view of the rotary looping-hook; Fig. 15, a perspective view of the hollow sliding spindle or tube; Fig. 16, a perspective view of the retracting hook-bar and its operating-lever; Fig. 17, a vertical section of the looping-hook enlarged, taken on the line 5 5, Fig. 18; Fig. 18, a plan view of the looping-hook; Fig. 19, a longitudinal section of the hollow sliding tube; Fig. 20, a plan view of the gear-section S'; Fig. 21, a section on line 6 6, Fig. 20.

Similar letters of reference in the several figures denote the same parts.

This invention relates to improvements in that class of harvester-binders which cut the grain, bind it into bundles, and discharge the bound bundles from the machine, all automatically and without the intervention of hand labor; and the invention consists in certain novel details of construction and combinations of parts, which will be hereinafter described and claimed.

In the drawings, A represents the grain-platform, and B the bar which supports the same and connects it to the main frame of the machine. The main frame here alluded to is not shown, but may be of any approved construction.

To the inner end of the bar B, next the main frame of the machine, is a stout wood or metal post, C, and secured at or near the top of this post by stout flanges or bolts is a metal bracket, D, having lateral arms $d\ d'$. The arm $d$ has a horizontal hollow bearing, $d^2$, upon which is mounted a wheel, E.

The arm $d'$ is made hollow for the accommodation of the shaft and pivot of the cord-carrying arm F of the binding mechanism, and has a vertical standard, $d^5$, upon which is mounted a centrally-pivoted lever, G, which operates the said cord-carrying arm, and also a tension-plate, G', and a spool, $G^2$, containing the binding-cord.

The wheel E has a long hub, $e$, and two sets of arms or spokes, $e'\ e'$, connecting said hub to its rim. Passing through this hub, and also through the hollow bearing $b^2$, on which it is mounted, is a shaft, $e^2$, having an enlarged end or head, $e^3$, provided with a projection, $e^4$, which engages with a recess, $e^5$, in the end of the hub $e$, so that when the wheel is revolved the shaft or bolt $e^2$ will also revolve. Any other mode of connecting the shaft with the hub may be resorted to, if desired.

The periphery of the wheel is provided with sprocket-teeth $e^6$ for the application of an endless driving-chain, J, with a cam-groove, $e^7$, for imparting a laterally-vibratory motion to the lever G, which operates the cord-carrying arm, and with an inclined cam projection, $e^8$, for operating the lever W of the primary clamping and cutting mechanism.

To the outer face of the wheel E are pivoted, at $e^9\ e^9$, reel-arms K K.

As the reel mechanism will form the subject-matter of a separate application about to be filed, it is not here claimed and need not be further described.

The endless chain J, which drives the wheel E, passes over a sprocket-wheel, L, mounted on a shaft, $l$, whose bearings are in the post C, and also over a smaller sprocket-wheel, M, secured to a shaft, $m$, that drives the platform-raking mechanism. Motion is imparted to the endless chain from the sprocket-wheel L, the shaft of such wheel being connected to the main drive-gear of the machine. The grain, having been cut and thrown onto the platform, is next to be gathered and conveyed to the binding apparatus. The means I employ for this purpose consists of a series of rake-fingers, N, of peculiar construction, adapted to be projected above the upper surface of the platform when moving forward toward the binding devices, but to be thrown down and pass below the platform when moving backward. To assist in understanding the construction of the rake-fingers and the devices by which they are operated, and also of the platform in which they work, attention is directed to Figs. 5, 6, 7, and 8.

The platform consists of three parts, A A' A², supported by the bar B at the front side and the bar B' at the side next the binding mechanism. Between the parts A and A' are arranged a series of endless chains, $n$, which pass around sprocket-wheels $n'$ at one end and around plain-pulleys $n^2$ at the other end. Each of the sprocket-wheels has a miter-gear, $n^3$, formed upon or secured to its under side, with which engages one of a series of corresponding miter-gears, $n^4$, keyed to a shaft, O, which extends through the bar B' and is geared to the shaft $m$, driven by the endless drive-chain J, as before described. To these endless chains $n$ are attached one or more of the rake-teeth, N. Each tooth consists of a long arm or blade, $n^5$, and a short weighted arm or block, $n^6$, wider than the long arm and projecting at right angles thereto. Each tooth is connected to the chain by a pivot-pin, $n^7$, on which it is free to turn. The teeth on the several endless chains are preferably located at corresponding points, so that they will all be in line when they advance toward the binding mechanism. Under each endless chain the part A' is slotted on one side, but forms a ledge on the other side.

Slots $a$ are provided in the top A of the platform, extending the entire length and part way back, as shown in Fig. 1. When the teeth move forward toward the binding mechanism their long arms or blades $n^5$ project through the slots $a$, while their short wide weighted arms $n^6$ slide along upon the ledges of A', between such ledges and the top A. After pressing the gathered bundle against the cord of the binding mechanism, the projecting blades move backward a short distance to separate and move back any straggling grain. As soon, however, as they reach the slotted portions of part A' they become unsupported, and their weighted short arms gravitate or drop and cause their long arms or blades to lie down parallel with the chain, with their extremities resting upon pins $n^8$, secured to the sides of the chains, as shown in Fig. 8. Continuing their backward movement, the weighted arms $n^6$ drag upon the lower part, A², with slight friction, so as to prevent the long arms by any possibility from getting under the pins $n^8$. When the teeth turn to make another forward movement the depending weighted arms $n^6$ strike the ledge of A' and again bring the long arms or blades into vertical position, ready for again sweeping the platform. As many endless chains may be employed as may be found necessary or desirable.

The belts may be run at different rates of speed, if desired.

The platform is provided with openings A⁴ at its outer edge, opposite the endless chain-rakes, for the discharge by the rakes of any straws that may work through the slots of the top of the platform. The lower part, A², of the platform protects the rakes from the stubble, and is preferably made of sheet metal.

The tying mechanism is constructed as follows:

R is a metal frame, carrying the looping, knotting, and part of the clamping devices. One arm, $r$, of this frame is bolted securely to the rear side of the post C. Another arm, $r'$, is bolted to the bar B' of the platform, and a third arm, $r^2$, is connected to the bar B by a brace-rod, $r^3$. The upper portion of the arm $r'$ is provided with a longitudinal slot or recess, $r^4$, at the inner end of which are located the looping-hook S and the fixed jaw T of what I denominate the "secondary clamp." Near the outer end of said slot or recess are located a cutting blade or knife, Q, and the primary clamp Q' Q².

The cord-carrying arm F is of peculiar construction. At its base it is provided with a gear-segment, $f$, with which engages a corresponding gear-segment, $g$, on the outer end of the operating-lever G. When the lever G is vibrated to right or left the cord-carrying arm is raised or depressed, as the case may be. The gear-segment $f$ is not made part of the arm proper, but is provided with a socket, $f'$, in which the shank of the arm proper is inserted and secured by a pin or bolt, $f^2$. The arm is capable of a slight swinging motion on the pin $f^2$, and is adapted to be held at any point by adjusting-screws $f^3 f^3$. A projection or spur, $f^4$, is formed on the back of the arm, near its middle, and is perforated for the passage of the binding-cord. At its extreme outer end the arm terminates in two grooved projections, T' and T², the former, T', of which co-operates with the fixed jaw T of the secondary clamp, to hold the end while the knot is being formed, while the latter, T², is adapted to carry the cord under the looping-hook to insure its engagement therewith, as will be presently explained. By means of the screws $f^3 f^3$ the pressure of the projection T' against the fixed jaw T is regulated. The back of the arm, near its extremity, is grooved, as seen at $f^5$, for the purpose of receiving and guiding the cord.

The binding-cord passes from the spool G² through holes in the tension-arm G', thence through the perforated projection or spur $f^4$, and thence through the groove $f^5$ and over the ends of the grooved projections T' T². As the arm moves down it enters the recess $r^4$, and, passing along to the inner end of the same, clamps the end of the cord tightly between the projection T' and the fixed jaw T. The next operation is to sever the cord by the cutter Q and clamp the new end thus formed in the primary clamps Q' Q². To understand how this is done the following detailed description of the primary clamp will be necessary.

Q' is the movable part of said clamp. It consists of a bar pivoted at its lower ends by pivots $q$ $q$ to a stout spring, U, and having a lateral projecting hook or clamping portion, $q'$, at its upper end, which co-operates with the fixed jaw Q² on the metal frame $r'$. Said bar is further provided near its pivots with lateral arms or lugs $q^2$ $q^3$, projecting on opposite sides, as shown. A spring, U', weaker than the spring U, exerts an upward pressure against the lugs $q^3$, so as to slightly incline the bar and throw its hook portion $q'$ forward. W is a lever fulcrumed on the bar B, and having an inclined or cam-shaped outer end, $w$, which lies in the path of the cam-shaped projection $e^8$ on the wheel E. The inner bent end, $w'$, of said lever lies normally below the lug $q^2$ of the bar Q'; but when the cam projection on the wheel E strikes the outer end of the lever its inner end, $w'$, lifts upon the lug $q^2$, and, overcoming the tension of the spring U', tilts the bar Q' on its pivots and causes the hook $q'$ to slide laterally on the part Q² and from under the cord, and then, next overcoming the tension of the stronger spring U, lifts the bar bodily from said part Q² higher than the cord. By this time the cam projection on the wheel E has passed by the outer end of lever W and the latter assumes its normal position, whereupon the compressed spring U' again acts to tilt the bar forward, so as to bring its hook $q'$ over the cord, and the compressed spring U depresses the bar. As the bar is depressed the hook carries the cord down against the cutter Q and cuts it off, and the new end formed by the cutting is tightly clamped between the hook and the part Q². For the purposes of this description it is unnecessary to consider what becomes of this first cut-off portion of the cord, inasmuch as it serves no further useful purpose. Let it therefore be supposed that the cord-carrying arm is now caused to rise to effect the binding of the first bundle. The end of the cord, it will be remembered, is still held in the clamps Q' Q². As the arm F rises the platform-rakes collect a bundle of grain and press it up against the binding-cord. The arm then again descends and carries the cord around the bundle, and, catching the two strands of cord in its grooved end projections, T' T², carries them through the recess $r^4$ and clamps them against the rigid jaw T of the secondary clamp. The bar Q' of the primary clamp then rises, passes over both strands of the cord, and, descending, severs both of them and clamps and holds the freshly-cut end for the next operation.

The next and final operation to be performed is to tie the ends of the cord securely together. The mechanism employed for this purpose consists of a rotary hook, S, a non-rotating but vertically-movable hollow cylinder or tube, X, and a sliding hook, Y, working in said tube X, all constructed and operated in manner following—that is to say, the rotating hook consists of a circular flange secured to a hollow spindle, $s$, and cut away so as to form a hook, as shown in Fig. 14. The lower side of the hook-flange has a bearing in a recessed portion of the metal frame R, and a flat spring, $s'$, presses upon the top of said flange to keep it always to its place. The hollow spindle $s$, to which the hook-flange is secured, has a bearing at its lower end, and is provided at or near its middle with a pinion, $s^2$, with which engage the teeth of a vibrating sector, S'. This gear-sector is pivoted to the arm $r^2$ of the metal frame R by a bolt, $s^3$, and is vibrated from a rock-lever, $s^4$, mounted on the post C, through a connecting-rod, $s^5$. The rock-lever in turn receives motion from a crank, $s^6$, secured to the projecting end of the shaft $e^2$, through a connecting-rod, $s^7$. Within the spindle $s$ the hollow cylinder or tube X is located. The lower end of this tube is made square, and slides in guides $x'$ $x'$, as shown in Figs. 12 and 13, to prevent rotation. A recess or slot is made in the outer face of the squared portion, so as to form ears or lugs $x^2$ $x^2$, between which slides a cam, $x^3$, secured to the under side of the vibratory gear-sector S', as shown in Figs. 12 and 13. As the gear-sector revolves the vibrating hook backward the cam $x^3$ elevates the upper end of the tube X above the upper face of the hook-flange, and said tube remains so elevated until the sector vibrates back and the hook nearly completes its forward rotation, when the tube is again retracted, for a purpose to be presently named.

Y is the hook-bar, articulated to the outer end of a lever, Y', pivoted to the metal frame R. This hook-bar extends up into the hollow cylinder or tube X. It has a flat hook at its upper end for the purpose of catching hold of the ends of the cord and drawing them down into the tube, as will be presently explained, and is provided with a collar, $y$, which fits the tube and keeps the bar properly centered therein. The shank of the hook is necessarily made slender, so that it will not bind in the tube. Articulated to the lever Y', near its pivot, is a latch-bar, $y'$, having a notch or recess, $y^2$, in one edge, and another notch or recess, $y^3$, in its opposite edge, but higher up. This latch-bar extends up through a slot in the arm $r^2$ of the metal frame R, and a stout spring, $y^4$, bears upon its top with considerable pressure.

Rigidly secured to the gear-sector S', near its pivot, is a cam, $y^5$, which works in the lower notch, $y^2$, of the latch-bar, and operates when the sector is vibrated in one direction to raise the latch-bar, and with it the lever Y' and hook-bar Y, as well as to impart to the latch-bar a lateral rocking motion on its pivot. A cross-pin, $y^6$, in the slot in the arm $r^2$ of the frame R, through which the latch-bar passes, engages with the upper notch, $y^7$, and holds the latch-bar in elevated position until the sector moves in the opposite direction, when a rigid projecting arm or cam, $y^8$, releases it.

Having described these parts, their manner of operation in tying the knot in the ends of the cord will be readily understood. When the two ends of the cord are brought up to the clamp-jaw T, they are both carried by the projections T' T² in front of the hook S. At this time the sector is at the outer limit of its movement, and the tube X is elevated above the top of the rotary hook, and the hook of the sliding hook-bar projects out through the upper end of said tube. The cutter Q and clamps Q' Q² having operated as before described, the sector moves inward toward the post C, and the rotary hook begins to rotate, carrying with it the two parts of the cord and winding them around the central tube, X. After the hook has gone around once the tube descends till its top is flush with the top surface of the hook-flange, the cord still remaining wound around it. When the hook goes around the second time the cords are not further wound about the tube, but are drawn across its top and under the projecting hook Y. The instant this is accomplished the arm $y^8$ on the vibratory sector strikes the latch-bar $y'$ and disengages the latter from the pin $y^6$, whereupon the spring $y^4$ forces the latch quickly down, thereby causing the lever Y' to descend, and with it the hook Y. The latter, catching the ends of the cord that lie across the top of the tube, pulls them down into the tube and through the cords wound around the tube, and immediately thereafter the tube descends to its fullest extent and slips off the loop of the cord, thus forming the knot, which is completed and drawn tight by the continued downward movement of the retracting-hook. The bundle of grain thus bound is then removed from the machine by any suitable means or allowed to remain and be pushed off by the next succeeding bundle.

It will be observed that, inasmuch as both the reel mechanism and the binding mechanism are mounted upon or secured to the post C, the weight of all such parts is borne at the place best calculated to sustain it—namely, at the inner end of the cutter-bar, next the main frame of the machine.

I claim as my invention—

1. In a harvester and binder in which the binding mechanism is located at one edge of the grain-platform, an endless chain or chains arranged within the platform, in combination with the pivoted rake-teeth and mechanism whereby said rake-teeth are caused to rise above the top of the platform as they move toward the binding mechanism, remain elevated during a portion of their backward movement, and then descend below the top of the platform for the remainder of their backward movement, substantially as described.

2. The combination, with the endless chains and the rake-teeth pivoted thereto, of the platform composed of the parts A A' A², the latter part, A², serving to retard the short arms of the teeth as they hang down in moving back, whereby to prevent the long arms or blades of the teeth from getting beneath the supporting-pins $n^8$, substantially as described.

3. The combination, with the jaw T and the projections T' T² on the end of the cord-carrying arm, of the horizontally-rotating hook S, having the gear-teeth $s^2$, the non-rotating but vertically-sliding tube X, the vibrating sector S', having the teeth for engaging with the teeth $s^2$, to rotate the hook, and carrying the cam $x^3$, by which the tube X is moved up and down, and the retracting-hook Y and means for operating it, substantially as described.

4. The central tube, X, having the squared lower end, sliding in guides $x'$ $x'$, and having the lugs $x^2$ $x^2$, in combination with the cam $x^3$ on the gear-sector, substantially as described.

5. The combination, with the retractible hook-bar Y and the lever Y', to which said hook-bar is connected, of the notched latch-bar $y'$, the cam $y^5$ on the vibrating sector, and the pin $y^6$, by means of which the hook is projected and so held, substantially as described.

6. The rigid arm $y^8$ on the sector and the stout spring $y^4$, for disengaging the latch-bar and causing the retraction of the hook-bar, substantially as described.

7. The combination of the metal frame R, constructed as described, with the post C and bars B and B', substantially as set forth.

8. The gear-sector S', pivoted to the frame R and operated from the crank $s^6$ through the rock-lever $s^4$ and the connecting-bars $s^5$ $s^7$, substantially as described.

9. The combination of the wheel E, having the cam-groove on its periphery, with the centrally-pivoted lever G, having the spur $e^\times$ at one end, which enters the cam-groove of wheel E, and having the gear-segment $g$ at the other end, which engages with the gear-segment $f$ at the base of the cord-carrying arm, substantially as described.

10. The combination of the cord-carrying arm having the spur $f^4$, the clamps T T', the cutting-blade Q, and the clamps Q' Q², substantially as described.

11. The hooked clamping-bar Q', in combination with mechanism for imparting to it a backward, upward, and forward motion, and the cutter Q and jaw Q², substantially as described.

12. The hooked clamping-bar Q', pivoted to and supported by the spring U, in combination with the weaker spring U', the operating-lever W, and the cam projection on the wheel E, substantially as described.

JOSIAH D. HEEBNER.

Witnesses:
JOSEPH L. TRUE,
ROBERT A. SHEPHERD.